United States Patent
Wager et al.

(10) Patent No.: US 10,506,450 B2
(45) Date of Patent: Dec. 10, 2019

(54) METHOD AND ARRANGEMENT FOR RELAYING

(75) Inventors: Stefan Wager, Espoo (FI); Niclas Wiberg, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 278 days.

(21) Appl. No.: 14/372,352

(22) PCT Filed: Jan. 16, 2012

(86) PCT No.: PCT/SE2012/050033
§ 371 (c)(1),
(2), (4) Date: Jul. 15, 2014

(87) PCT Pub. No.: WO2013/109171
PCT Pub. Date: Jul. 25, 2013

(65) Prior Publication Data
US 2014/0334331 A1    Nov. 13, 2014

(51) Int. Cl.
*H04W 16/26* (2009.01)
*H04B 7/155* (2006.01)
*H04W 84/04* (2009.01)

(52) U.S. Cl.
CPC ........ *H04W 16/26* (2013.01); *H04B 7/15507* (2013.01); *H04W 84/047* (2013.01)

(58) Field of Classification Search
None
See application file for complete search history.

(56) References Cited

U.S. PATENT DOCUMENTS 8,050,235 B2 * 11/2011 Kang ............... H04B 7/026
370/315
2005/0254442 A1 * 11/2005 Proctor, Jr. ......... H04B 7/1555
370/294

(Continued)

FOREIGN PATENT DOCUMENTS

WO    2007055544 A2    5/2007

OTHER PUBLICATIONS

Unknown, Author, "Transparent Relay for LTE-Advanced FDD", Nortel Networks. TSG-RAN1 #53bis, Warsaw, Poland, Jun. 30-Jul. 4, 2008, 1-8.

(Continued)

*Primary Examiner* — Mansour Oveissi
(74) *Attorney, Agent, or Firm* — Patent Portfolio Builders, PLLC

(57) ABSTRACT

Uplink-only relay and donor network node and methods therein for supporting connection of a UE in a cell associated with the network node to the uplink-only relay for uplink communication. A method in the uplink-only relay involves monitoring a relation, in terms of performance, between a direct uplink communication from the UE to the network node, and a potential relayed uplink communication from the UE to the network node via the UORN. This method further comprises indicating to the network node when the relation fulfills a condition. A method in the network node involves receiving information, from the UORN, indicating a monitored UE for which a condition is fulfilled. The condition is related to a relation, in terms of performance, between a direct uplink communication from the UE to the network node, and a potential uplink communication relayed via the UORN.

30 Claims, 8 Drawing Sheets

(56) References Cited

U.S. PATENT DOCUMENTS

| | | | | |
|---|---|---|---|---|
| 2007/0160014 A1* | 7/2007 | Larsson | H04B 7/022 | 370/338 |
| 2008/0009243 A1* | 1/2008 | Hart | H04W 52/46 | 455/67.13 |
| 2008/0220806 A1* | 9/2008 | Shin | H04W 52/08 | 455/522 |
| 2008/0285500 A1* | 11/2008 | Zhang | H04B 7/15507 | 370/315 |
| 2009/0034447 A1* | 2/2009 | Yu | H04B 7/15542 | 370/315 |
| 2009/0047898 A1* | 2/2009 | Imamura | H04B 7/155 | 455/7 |
| 2009/0053994 A1* | 2/2009 | Senarath | H04B 7/2606 | 455/11.1 |
| 2009/0175214 A1 | 7/2009 | Sfar et al. | | |
| 2009/0219852 A1* | 9/2009 | Youn | H04L 45/00 | 370/315 |
| 2009/0227201 A1* | 9/2009 | Imai | H04B 7/15557 | 455/7 |
| 2009/0296626 A1* | 12/2009 | Hottinen | H04B 7/155 | 370/315 |
| 2010/0022184 A1 | 1/2010 | Khoshnevis et al. | | |
| 2010/0039947 A1* | 2/2010 | Li | H04L 1/0026 | 370/252 |
| 2010/0067417 A1* | 3/2010 | Zhou | H04B 7/155 | 370/311 |
| 2010/0103861 A1* | 4/2010 | Ulupinar | H04L 29/12207 | 370/315 |
| 2010/0128622 A1* | 5/2010 | Horiuchi | H04B 7/155 | 370/252 |
| 2010/0315956 A1* | 12/2010 | Nakao | H04B 7/155 | 370/245 |
| 2010/0322145 A1* | 12/2010 | Yu | H04B 7/155 | 370/315 |
| 2011/0009116 A1* | 1/2011 | Moberg | H04W 36/0088 | 455/425 |
| 2011/0021157 A1* | 1/2011 | Sahara | H04L 1/1812 | 455/67.13 |
| 2011/0171902 A1* | 7/2011 | Toyoda | H04W 84/047 | 455/9 |
| 2011/0176477 A1* | 7/2011 | Lee | H04B 7/15592 | 370/315 |
| 2011/0195708 A1* | 8/2011 | Moberg | H04W 36/0094 | 455/424 |
| 2011/0274032 A1* | 11/2011 | Leng | H04B 7/15542 | 370/315 |
| 2012/0015662 A1* | 1/2012 | Zhang | H04B 7/2606 | 455/445 |
| 2012/0034865 A1* | 2/2012 | Seki | H04B 7/155 | 455/7 |
| 2012/0108253 A1* | 5/2012 | Mao | H04W 48/20 | 455/450 |
| 2012/0140652 A1* | 6/2012 | Pan | H04B 7/15592 | 370/252 |
| 2012/0176955 A1* | 7/2012 | Ishii | H04W 72/042 | 370/315 |
| 2012/0201229 A1* | 8/2012 | Feng | H04L 5/0053 | 370/336 |
| 2012/0202503 A1* | 8/2012 | Kitaji | H04B 7/155 | 455/438 |
| 2012/0213148 A1* | 8/2012 | Saito | H04B 7/15542 | 370/315 |
| 2012/0236782 A1* | 9/2012 | Bucknell | H04B 7/155 | 370/315 |
| 2013/0010682 A1* | 1/2013 | Kim | H04W 72/1289 | 370/315 |
| 2013/0033992 A1* | 2/2013 | Higuchi | H04W 72/085 | 370/246 |
| 2013/0039185 A1* | 2/2013 | Teyeb | H04B 7/155 | 370/235 |
| 2013/0039261 A1* | 2/2013 | Bi | H04L 5/0053 | 370/315 |
| 2013/0084795 A1* | 4/2013 | Van Phan | H04B 7/15592 | 455/15 |
| 2013/0163440 A1* | 6/2013 | Issakov | G01S 5/0221 | 370/246 |
| 2013/0308521 A1* | 11/2013 | Mikhail | H04W 72/085 | 370/315 |
| 2013/0336200 A1* | 12/2013 | Andreozzi | H04W 40/22 | 370/315 |
| 2014/0169279 A1* | 6/2014 | Song | H04W 72/082 | 370/329 |

OTHER PUBLICATIONS

Office Action issued in application No. 12702898.3; dated Jan. 17, 2017; 03 pages.

* cited by examiner

4:1 : RSRP report
4:2 : Indication of UE to monitor
4:3 : Grant for UL transmission
4:4 : UL transmission
4:5 : Indication of certain relation concerning direct and relayed UL communication
4:6 : Indication of UE to be relayed
4:7 : Grant for UL transmission comprising LA for relaying
4:8 : UL transmission
4:9 : Grant for UL transmission
4:10: Relayed UL transmission (4:8)

i= intercepted

METHOD AND ARRANGEMENT FOR RELAYING

TECHNICAL FIELD

The invention relates generally to relaying in cellular communication systems, and in particular to a method and arrangement for supporting the same.

BACKGROUND

In a cellular network, there may be areas with "high traffic", i.e. a high concentration of users. An exemplifying cell 100 comprising areas 103 with a high concentration of users is illustrated in FIG. 1a. In such high traffic areas 103 it may be desired to deploy additional capacity in order e.g. to keep the user satisfaction. Capacity could be added in the form of an additional macro base station, generating/serving a cell which covers one or more of the area(s) in need of extra capacity. Capacity could also be added in the form of additional nodes with lower output power, as compared to a macro base station, and thus covering a relatively smaller area, to which the desired capacity boost is concentrated.

There may also be areas, e.g. within a macro cell, with unfavorable radio conditions or "bad coverage", where there may be a need for coverage extension. One way to achieve a coverage extension is to deploy an additional node, e.g. a node with a low output power, which concentrates the coverage boost to a relatively small area, e.g. where it is most needed.

One argument for choosing nodes with lower output power for increasing capacity or coverage as in the above cases is that the impact on the "original" macro nodes/network can be minimized. That is, by that the interference to an "original" macro node, with a coverage which at least partially overlaps the coverage of the "added" lower output power node, may be limited to a relatively small area.

FIG. 1b illustrates a macro base station 102, which provides a wide area coverage 100 (also called macro cell). FIG. 1b also shows examples of low power nodes that are deployed to provide small area capacity/coverage. In this example, pico base stations 104, relays 108 and home base stations 112 (femto cells) are shown, with respective coverage areas 106, 110, and 114. A pico base station can either be similar to a macro eNB, but typically with more limited coverage, for example, having a lower max transmission power, or, be a remote radio unit connected to a main unit. A common term for such pico/relay/femto cells is "underlay cells", served by "underlay nodes". This type of network deployments are typically referred to as: "Heterogeneous Networks", "multilayer networks" or shortly "HetNets".

Underlay cells typically operate at lower reference (pilot/perch) signal powers, as compared to macro cells. This means that if the cell selections as well as mobility decisions are based on received reference signal strengths, the downlink cell border will be located closer to the underlay node than to the macro node/base station/eNB. If the uplink sensitivity for all cells is similar, or if the difference in uplink sensitivity is not equivalent to the difference in reference (pilot/perch) signal powers, then the uplink cell border will be different from the downlink cell border.

FIG. 2 illustrates a scenario where the uplink 204 and downlink 206 cell borders are separated. A situation where the UL and DL borders are separated may be referred to as an uplink/downlink (or downlink/uplink) imbalance in the area between the separated borders. This means that a UE in the area between the separated borders will have a better uplink connection to the underlay node 208, but because of the stronger DL transmit power of the macro node 202, it will receive a stronger DL signal from the macro node 202. The situation of uplink/downlink imbalance is not limited to macro cell/underlay cell combinations, but may arise also between macro cells and in locations with unfavorable radio conditions, e.g. in urban environments.

Referring to the example illustrated in FIG. 2, a first UE served by the macro node 202 may cause significant uplink interference to the underlay node 204 if located in an area relatively close to the underlay node. In fact, if located in the area with uplink/downlink imbalance, said UE may even have the best uplink to the underlay node/cell, but might nonetheless not have detected the underlay cell reference signal.

One way to relieve this situation of significant interference to the underlay node is to consider an underlay cell range expansions by considering offsets in the cell selection and/or mobility decisions. Thereby, potentially interfering UEs served by the macro node will be at a longer distance away from the underlay node, and thereby induce less interference to the underlay node. However, this also means that some UEs served by the underlay node can be subjected to critical interference from the macro node in the downlink.

Concerning relays, relaying support was added in the Rel-10 version of 3GPP LTE specification. The relay solution described in Rel-10 is a so-called "layer 3 relay", which means that all radio protocols (layers 1-3) are terminated in the Relay Node (RN). UEs connect to the RN over standard Uu interface, meaning that backwards compatibility with Rel-8 UEs is achieved. From a UE perspective, the RN looks like an ordinary eNB. The RN has no fixed backhaul, but connects wirelessly to a donor cell using the Un interface. The donor cell is controlled by a donor eNB and is based on Uu protocols, with some modifications. The donor eNB also serves UEs connected directly to the donor eNB.

So-called "inband relays" operate in the same frequencies as the macro layer (i.e. same as the donor node), which implies that the same frequency range is used on the access link and backhaul link. One issue with these relays is the uplink/downlink imbalance problem, which comes from the fact that the relay uses a lower transmit power than the macro eNBs, as described above and illustrated in FIG. 2. Because of its lower transmit power, the size of the relay cell, when measured based on downlink Reference Symbol Received Power (RSRP), is smaller than the macro cell. Still, when considering uplink transmissions, UEs connected to the macro cell and located close to the relay cell may cause interference to UEs connected to the relay cell, as previously mentioned.

One solution to the uplink/downlink imbalance problem is to base the cell selection on UE measured path loss, instead of RSRP. In that case, the relay cell size is effectively increased (cell range extension), so that all UEs that have a better uplink to the relay connect to it. Further, an offset to the RSRP measurement can be used to increase the cell size of the relay cell. Users in cell range extension will then suffer from downlink interference from the macro eNB transmitting at higher power than the relay node. This situation needs to be solved by coordinating downlink transmissions between the macro and the relay cells in either frequency or time domain. Solutions for this were introduced in Rel-10, e.g. Carrier Aggregation can be used in frequency domain, and Almost Blank Subframes in time domain.

An alternative way to build a relay and to avoid the uplink/downlink imbalance problem would be to provide relaying only in the uplink, which is illustrated in FIG. 3. FIG. 3 illustrates an uplink only relay, UORN, associated with a donor eNB. The UORN is further associated with an uplink relay area, 302, in which area UEs may be served in the uplink by the UORN and in the downlink by the eNB. Thus, the downlink would still be received from the (macro) eNB. With this solution, only uplink coverage can be extended, but because of its lower transmit power, the UE is expected to be uplink coverage limited (rather than downlink coverage limited).

Such an uplink only relay would terminate only layer 2 protocols, i.e. up to MAC layer. Such layer 2 relay nodes were discussed during early phases of the Rel-10 standardization, but were abandoned in favor of the layer 3 relay described above.

SUMMARY

Even though uplink only relays have been previously considered, one thing which has not been discussed or presented so far is how to determine which UEs that should be connected via an uplink only relay. Since there is no DL transmission from the relay, there is no relay "cell" and no interference to neighboring macro cells. However, this also means that there is no signal from the uplink only relay for the UE to measure on, in order to determine when it would be appropriate to connect to the relay for UL relaying. This is identified as a problem. Herein, a method and devices are provided for selecting which UEs to connect via an uplink only relay.

According to a first aspect, a method is provided in an Uplink-Only Relay Node, UORN, associated with a donor network node. The donor network node is assumed to serve a cell in a cellular communication system. The method is suitable for supporting connection of a UE in the cell to the UORN for uplink communication. The method comprises monitoring a relation, in terms of performance, between a direct uplink communication from the UE to the donor network node, and a potential relayed uplink communication from the UE to the donor network node via the UORN. The method further comprises indicating to the eNB when the relation fulfills a condition.

According to a second aspect, an UORN is provided. The UORN is operable to being associated with a donor network node, where said donor network node serves a cell in a cellular communication system. The UORN is suitable for supporting connection of a UE in the cell to the UORN for uplink communication. The UORN comprises processing circuitry which is configured to monitor a relation, in terms of performance, between a direct uplink communication from the UE to the donor network node, and a potential relayed uplink communication from the UE to the donor network node via the UORN. The processing circuitry is further configured to indicate to the donor network node when the relation fulfills a condition.

According to a third aspect, a method is provided in a donor network node. The donor network node is assumed to be associated with an UORN. The method is suitable for supporting connection of a UE in the cell to the UORN for uplink communication with the donor network node. The method comprises receiving information, from the UORN, indicating the identity of a monitored UE for which a condition is fulfilled. The condition is related to a relation, in terms of performance, between a direct uplink communication from the UE to the donor network node, and a potential uplink communication relayed via the UORN. If the UE is to be relayed, the method further comprises indicating, to the UORN, that the UE will be relayed via the UORN; and further comprises: adjusting uplink link adaptation of the UE based on the received information.

According to a fourth aspect, a network node is provided, operable to serve one or more cells in a cellular communication system. The network node is further operable to being a donor network node associated with an UORN. The network node is suitable for supporting connection of a UE in the cell to the UORN for uplink communication with the network node. The network node comprises processing circuitry configured to receive information, from the UORN, indicating a monitored UE for which a condition is fulfilled. The condition is related to a relation, in terms of performance, between a direct uplink communication to the network node, and a potential uplink communication relayed via the UORN. The processing circuitry is further configured to, if the UE is to be relayed, indicate to the UORN that the UE will be relayed via the UORN, and further to adjust uplink link adaptation of the UE based on the received information.

The methods and nodes described above may be used for effectively selecting which UEs to route via an uplink only relay.

The methods and nodes described above may be implemented in different embodiments. For example, the monitoring may involve reading a grant for uplink communication, which is sent from the donor network node to the UE. The monitoring may further involve determining a received signal quality of an uplink transmission corresponding to the read grant. The monitoring may alternatively or in addition involve determining a received signal quality of channel sounding reference signals of the UE. The received signal quality may be determined in terms of e.g. Signal to Noise Ratio, SNR; Eb/N0, Block Error Rate, BLER; and/or Bit Error Rate, BER.

The condition may relate to that the determined received signal quality would support a transport block size being larger for the potential relayed uplink than the transport block size used on the direct uplink. For example, the condition may relate to that the determined received signal quality would support a transport block size on the potential relayed uplink which is twice the size of the transport block size used in the direct uplink.

The UE of which the relation is to be monitored may be selected, in the UORN, based on e.g. a UE indicator received from the donor network node and/or the PDCCH format of grants for uplink transmission, sent from the donor network node to the UE. Further, the method in the UORN may comprise receiving information from the donor network node, regarding a UE, of which the uplink communication with the donor network node is to be relayed via the UORN. For example, this information could come in response to an indication sent to the donor network node, indicating that the condition is fulfilled for the UE. The method in the UORN may also comprise relaying uplink communication from the UE to the donor network node, according to the received information.

Further, reports may be received, by the network node, from a UE in the cell. The reports may relate to a received power of reference signals received by the UE. It may be determined, in the network node, based on the reports, whether the UE is a candidate for being relayed in the uplink by the UORN. If/when it is determined that the UE is a candidate for being relayed, the identity of the UE may be indicated to the UORN (by the network node) for monitoring. It could even be determined in the network node, e.g. based on the reports, whether the UE is to be relayed in the uplink by the UORN.

The reports received by the network node may be related to received power of reference signals sent from the network node, and possibly also to the received power of reference signals sent from neighboring network nodes (other than the donor network node). The determining of whether a UE is a candidate for being monitored may involve comparing information comprised in the reports to a threshold and/or to a reference pattern related to signals received from at least two different network nodes. The reference pattern may reflect a position of the UE in relation to the donor network node and at least one other network node. The threshold may reflect a position of the UE in relation to the donor network node. Further, the indicating, to the UORN, of that the UE will be relayed via the UORN, may involve an indicator implying that grants for uplink communication related to the UE are to be monitored by the UORN.

The embodiments above have mainly been described in terms of a method. However, the description above is also intended to embrace embodiments of the UORN and network node, configured to enable the performance of the above described features. The different features of the exemplary embodiments above may be combined in different ways according to need, requirements or preference.

BRIEF DESCRIPTION OF THE DRAWINGS

The invention will now be described in more detail by means of exemplifying embodiments and with reference to the accompanying drawings, in which.

DETAILED DESCRIPTION

Figure 1A:
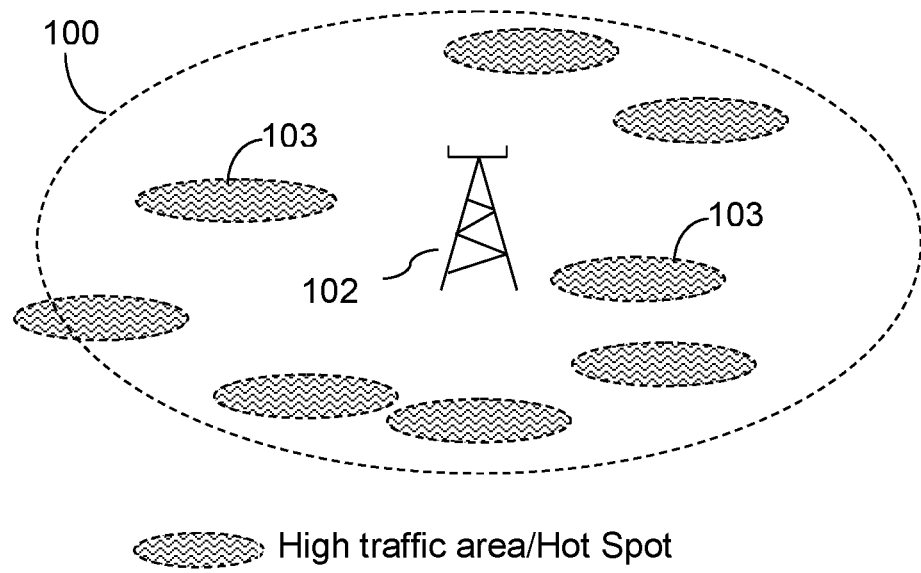
FIG. 1a is a schematic view showing a cell comprising areas with high traffic, according to the prior art.
Figure 1B:
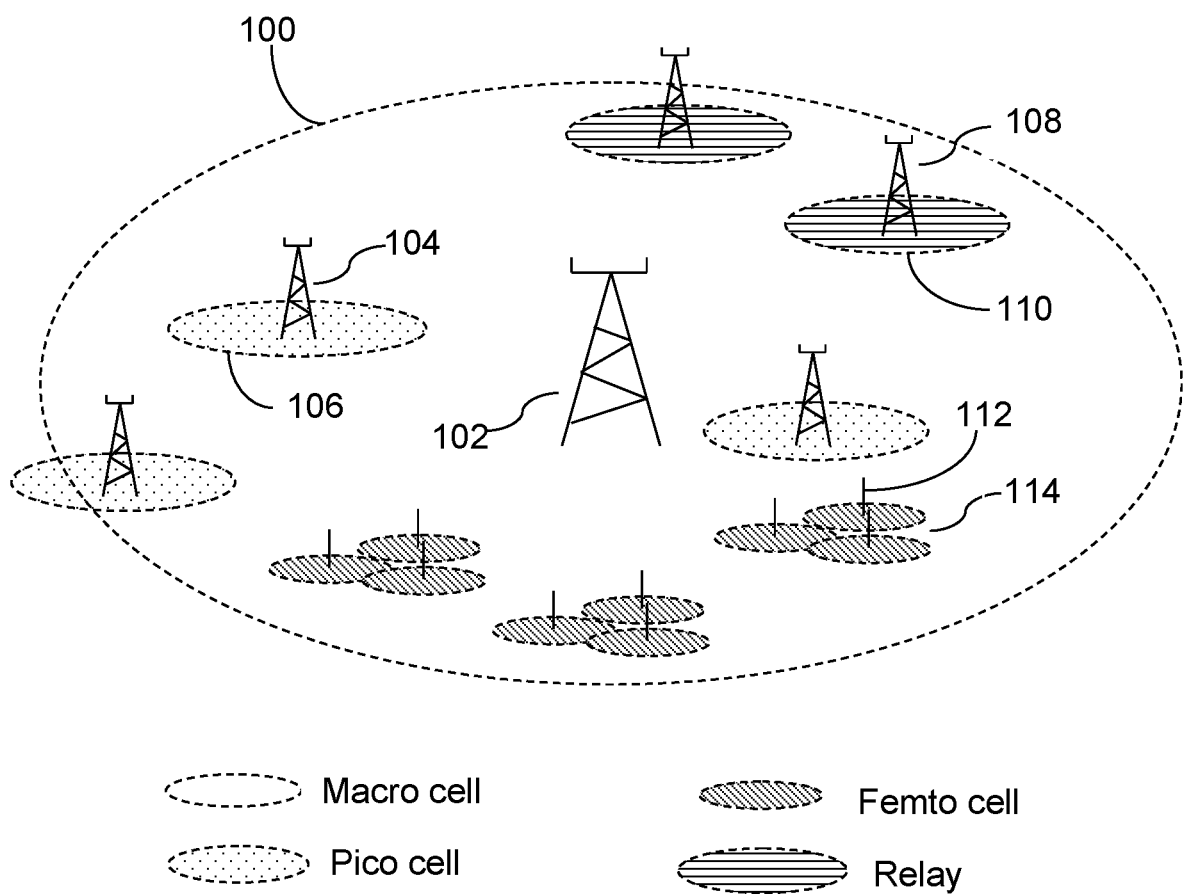
FIG. 1b is a schematic view showing an example of a constellation of different cells in a cellular communication system, according to the prior art.
Figure 2:
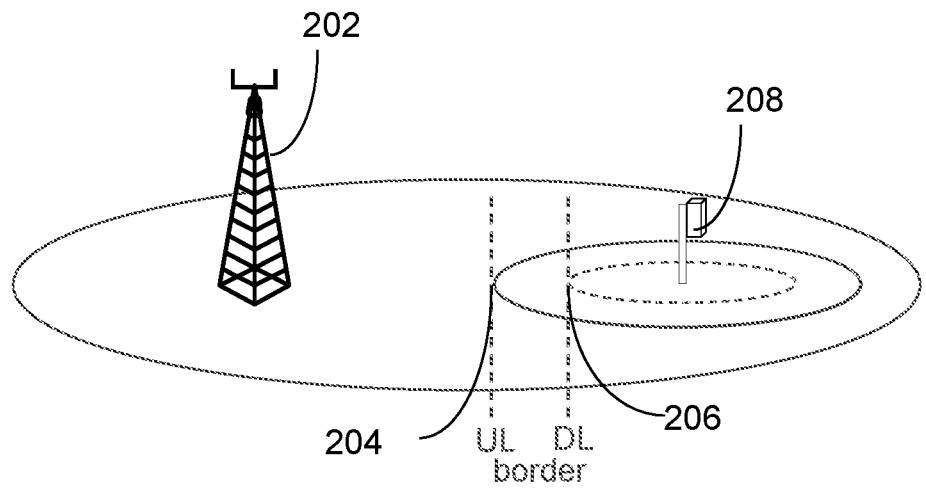
FIG. 2 is a schematic view showing an example of an area with an uplink/downlink imbalance, according to the prior art.
Figure 3:
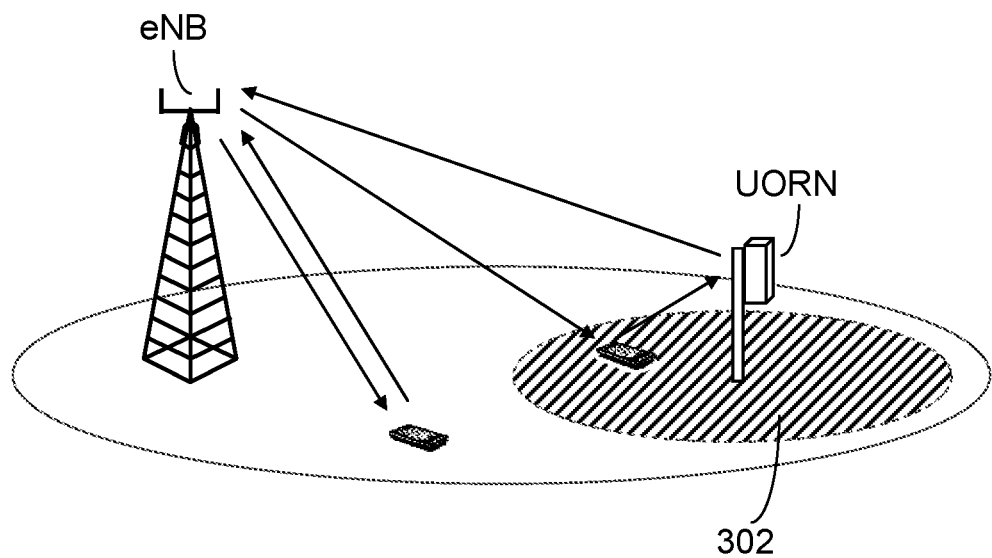
FIG. 3 is a schematic view showing a constellation of network nodes and related cells, in which different embodiments could be applied.

In the rest of the document, the term "relay" refers to uplink only relay if not otherwise stated. The term "donor network node" will be used as referring to a network node, such as an eNB, operable to be associated with a relay. The term "intercepting" is used as meaning reading and/or performing measurements and/or other operations on a message or transmission which is intended for or destined to another node (than the intercepting node). The node(s) for which the transmission was intended will also receive the transmission.

In LTE operation, uplink grants are transmitted on the Physical Downlink Control Channel (PDCCH). UEs are addressed by a UE specific identifier, the Radio Network Temporary Identifier (RNTI). The RNTI is masked with an error checksum (CRC) which is appended to each grant. By calculating the CRC for its own RNTI, a UE can determine both that the grant is received intact and that it is the right receiver. The uplink grant contains information on which uplink resources, coding, transport block size, etc., that the UE shall use for the uplink transmission.

Thus, by reading (intercepting) an uplink grant from the donor network node, the relay is able to acquire information related to the link quality between a UE and the donor network node. This could be performed by determining (by reading the grant) link adaptation parameters chosen by the donor network node for the UE, since the link adaptation parameters are selected based on the link quality between the UE and the donor network node. Further, the relay could, based on information comprised in the intercepted grant, determine the received quality, e.g. received Signal to Noise Ratio (SNR) e.g. of the corresponding uplink transmission from the UE. By comparing i) the information on the quality of the link between the UE and the donor network node, and ii) the information on the quality of the link between the UE and the relay, with each other, the relay would be able to determine whether the link between the relay and the UE (plus the link between the relay and the donor network node) is better than the link between the UE and the donor network node. If the link between the relay and the UE (plus the link between the relay and the donor network node) is found to be better, the relay may inform the donor network node of this situation, so that the donor network node can ensure that data is routed via the relay when adequate. This scheme will be further described below.

For inband relays, the donor network node and relay share the same uplink resources, which means that all traffic routed via the relay must be transmitted twice in the same resource space. Thus, in order to optimize capacity, uplink data should preferably only be routed via the relay if the link between the UE and the relay, and the link between the relay and the donor network node, together, require less resources than the direct link between the UE and the donor network node. Resources in this case are frequency (Resource Blocks) and time (subframes). However, in order to optimize user bit rate, traffic should be routed via the relay as soon as a larger transport block size can be supported.

Reading all grants from a donor network node, e.g. by scanning for all possible RNTIs, may be a cumbersome task for a relay. Therefore, the relay could in a specific embodiment be configured to monitor e.g. only grants with PDCCH format 2 or 3, which are the formats used for UEs in poor coverage areas. The UEs for which PDCCH format 2 or 3 are used are also likely to have a poor uplink to the donor network node. Thus, these UEs are good candidates for having their uplink routed via the relay.

Another way to limit the number of grants or RNTIs to be monitored by the relay is to configure the donor network node to send a record or list of RNTIs that the relay shall monitor. Such a record or list could comprise all UEs connected to the donor network node, or a subset of these UEs, selected based on some criterion. For instance, the donor network node could use pathloss estimates to create a subset of UEs. In one embodiment, the donor network node estimates the pathloss based on knowledge about the transmitted power and on RSRP measurement report sent by the UEs, which RSRP measurements refer to the link between the UE and the donor network node. A UE may e.g. be included into the subset associated with a relay if the pathloss to the donor network node is below a predefined level. In another embodiment, the donor network node could determine the subset of UEs to be monitored by a relay based on RSRP measurement from the UE including measurements of one or more other neighboring macro cells/network nodes (other than the serving (donor) network node). By storing the RSRP measurements from UEs connected to, or close to the relay, the donor network node could identify or form a reference pattern or fingerprint of UEs that are good candidates for being monitored by the UL only relay. In other words, UEs that may be good candidates for being relayed or monitored by the relay may be identified based on the relation between, or the respective values of, the reported RSRP measurements for different neighboring network nodes from said UEs.

Once the donor network node has determined that it would be beneficial to route the uplink data from the UE via the relay, it can inform the relay of the identity (RNTI) of the UEs whose uplink will be routed via the relay. The actual data transmission via relay can take e.g. the following steps:

The donor network node schedules, i.e. sends a grant for uplink communication to, the reported UE, using the link adaptation information received from the relay The relay detects the grant and receives the corresponding uplink transmission The donor network node schedules the relay node with a fixed time offset from the original transmission, so that the relay can transmit the received information to the donor network node. The donor network node uses the fixed time offset to determine the origin of the data.

In another embodiment, several relays are connected to the same donor network node. The donor network node creates one "to be monitored" UE subset for each relay. In yet another embodiment, the donor network node creates UE subsets associated with only one relay, but also UE subsets associated with two or more relays. For instance, a UE may be equally close to the donor network node and two different relays. For the UEs in the second subset type, two or more relays detect and intercept the scheduling information sent by the donor network node and receive/intercept the corresponding uplink transmission, as previously described. In one embodiment, the donor network node schedules all the relays associated with a UE to forward the data received from this UE. In another embodiment, the donor network node sorts the relays in decreasing probability of a correct reception and schedules the relays in this order until the data from the UE is correctly received.

Figure 4:
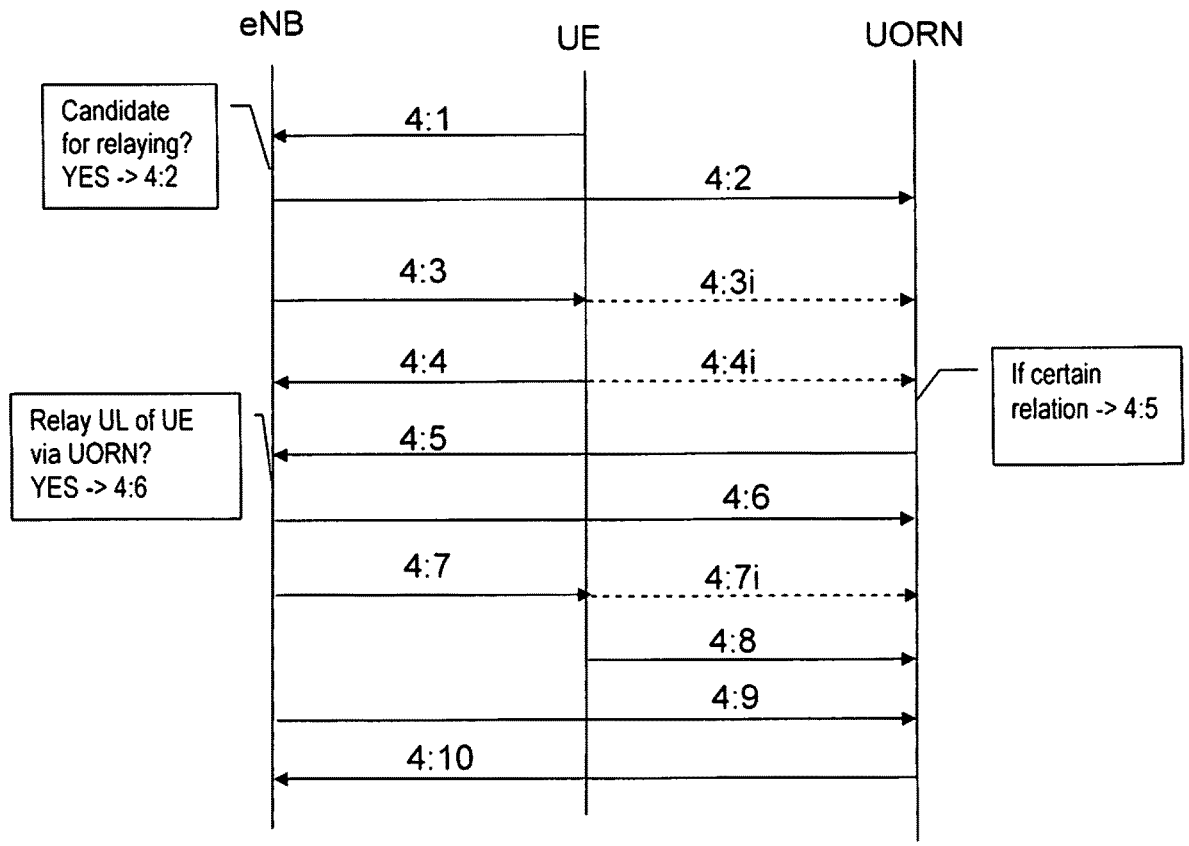
FIG. 4 is a signaling scheme illustrating signaling between a donor network node, a UE and an Uplink Only Relay Node (associated with the donor network node), according to an exemplifying embodiment.

FIG. 4 illustrates signaling, according to an exemplifying embodiment, between donor network node in form of an eNB; an UORN associated with the eNB and a UE. The UE is initially only served by the eNB, both in the uplink and the downlink.

The UE sends an RSRP-report 4:1 to the eNB, which relates to reference signals received from the eNB. The eNB analyzes the report and determines whether the UE is a candidate for relaying. If the UE is found to be a candidate for relaying, the eNB sends an indication 4:2 to the UORN, implying that the UE is to be monitored.

The eNB sends a grant for uplink communication 4:3 to the UE, which is intercepted 4:3i by the UORN. Thereafter, the UE sends the granted uplink communication 4:4 to the eNB, which communication is also intercepted 4:4i by the UORN. When it is determined by the UORN that a condition is fulfilled for an uplink relation of the monitored UE, the UORN sends an indication 4:5 of the determined relation to the eNB. The indication further comprises information on the link between the UE and the UORN. If the UE is to be relayed via the UORN, the identity of the UE is indicated 4:6 to the UORN.

The eNB sends a grant for uplink communication 4:7 to the UE, which grant comprises information on link adaptation parameters, which are determined based on the link between the UE and the UORN. The grant is intercepted 4:7i by the UORN, which then may receive the uplink communication 4:8 corresponding to the grant 4:7. The eNB sends a grant for uplink communication 4:9 to the UORN, i.e. schedules the second part/transmission of the relaying. The UORN relays 4:10 the uplink communication 4:8 of the UE to the eNB. 4:7-4:10 then repeats until the relaying is interrupted.

Regarding the exemplifying embodiments described below, during performance of the methods or procedures, the Uplink-Only Relay Node, UORN, is assumed to be associated with a donor network node. The donor network node is assumed to serve a cell in a cellular communication system, such as an LTE or LTE-A system. The methods and nodes described below are suitable for supporting connection of a UE in the cell to the UORN for uplink communication.

Exemplifying Procedures, UORN

Exemplifying embodiments of the procedure in an UORN of supporting connection of a UE to the UORN will be described below with reference to FIGS. 5a and 5b.

A relation, in terms of performance, between a direct uplink communication from the UE to the donor network node, and a potential relayed uplink communication from the UE to the donor network node (via the UORN) is monitored in an action 404. The UE could be monitored simply for the reason that it is present in the cell, e.g. when all UEs in the cell are to be monitored. Alternatively, the UE could be selected for monitoring based on information or rules. For example, an instruction or indication could be received from the donor network node in an action 402, comprising instructions or an indication of which UE or UEs to monitor, e.g. in form of a list or record. Such a record could in some embodiments comprise, e.g. a range of RNTIs. Alternatively, or in addition, the UORN may be provided with a set of rules, e.g. during initialization, of which UEs to monitor, e.g. UEs for which a certain PDCCH format is used for uplink grants. Such rules or information could also be provided by the donor network node.

The monitoring may involve reading a grant for uplink communication, which is sent from the donor network node to the UE. The monitoring may further involve determining a received signal quality, of an uplink transmission corresponding to the grant. That is, the uplink transmission, which was granted by the intercepted grant, is identified, and the received signal quality (at the UORN) of said uplink transmission is determined. Alternatively or in addition, a received signal quality (at the UORN) of channel sounding reference signals of the UE is determined. Such reference signals are typically transmitted by UEs at certain intervals.

The received signal quality of either the uplink transmission corresponding to the intercepted grant or of the channel sounding reference signals may be determined in different ways. For example, the received signal quality could be determined as one or more of: a Signal to Noise Ratio, SNR; an energy per bit to noise power spectral density ratio, Eb/N0; a Block Error Rate, BLER; and a Bit Error Rate, BER.

Further, when it is determined, e.g. in an action 406, that the monitored relation fulfills a condition, this is indicated or reported to the donor network node in an action 408. The indication or report may comprise e.g. the RNTI of the UE in question, and a CQI related to the link between the UE and the UORN, such that the donor network node can make or adjust the link adaptation for the UE according to the link between UE and the UORN. The condition may relate to that the potential relayed uplink would support a larger transport block size than the transport block size used on the direct uplink. For example, the condition may relate to that the determined received signal quality would support a transport block size on the potential relayed uplink being twice the size of the transport block size of the direct uplink. The higher block size should also be supported on the backhaul, i.e. the link from UORN to the donor network node. As long as no condition, e.g. within a set of conditions, is fulfilled, the relation of the UE may continue to be monitored, e.g. at certain intervals.

The indication, to the donor network node, of that a condition is fulfilled for a certain UE enables the donor network node to take action such that the UE is connected to the UORN and the uplink communication of the UE is relayed via the UORN. The donor network node could also determine whether to relay the uplink communication of the UE or not, based on one or more further conditions, which may be unknown to the UORN. For example, such a condition may relate to information received from UEs, e.g. reports of received reference signal strength. When the uplink communication of a UE is to be relayed via the UORN, information (e.g. an indication or instruction) from the donor network node regarding the UE of which the uplink communication is to be relayed is received (by the UORN) in an action 410. When having received such information from the donor network node, the uplink communication of the UE is relayed by the UORN according to the information, e.g. in an action 412. For example, the information may comprise an indication of that the UORN shall monitor uplink grants for the UE in question. By intercepting grants for uplink communication for the UE, the UORN may receive the uplink transmissions corresponding to the grants, and then relay said uplink transmissions to the donor network node, when being scheduled by the donor network node.

Exemplifying Arrangement, UORN

Below, an exemplifying UORN, adapted to enable the performance of the above described procedure of supporting connection of a UE to the UORN will be described with reference to FIG. 6. The UORN is illustrated as to communicate with other entities via a communication unit 602, which may be considered to comprise means for wireless (and possibly wired) uplink communication. The transmitter comprised in the communication unit 602 does not need to be as powerful as in a regular relay which communicates with UEs in the downlink. The parts of the network node which are adapted to enable the performance of the above described procedure are illustrated as an arrangement 600, surrounded by a dashed line. The arrangement and/or UORN may further comprise other functional units 614, for providing e.g. remaining regular relay functions. The arrangement and/or node may further comprise one or more storage units 612.

The arrangement 600 could be implemented by processing circuitry, e.g. by one or more of: a processor or a micro processor and adequate software (and storage therefore), a Programmable Logic Device (PLD) or other electronic component(s)/processing circuit(s) configured to perform the actions mentioned above in conjunction with FIGS. 5*a* and 5*b*.

The arrangement 600 may be implemented and described as follows: The arrangement 600 may comprise a monitoring unit 604, adapted to monitor a relation, in terms of performance, between a direct uplink communication from the UE to the donor network node, and a potential relayed uplink communication from the UE to the donor network node via the UORN. The arrangement 600 further comprises an indication unit 608, which is adapted to indicate to the donor network node when the relation fulfills a condition. The determining of whether a condition is fulfilled may be considered as part of the monitoring, or be performed in a determining unit 606, which is adapted therefore.

The monitoring unit 604 may be adapted to read a grant for uplink communication, which is sent from the donor network node to the UE. The monitoring unit may further be adapted to determine a received signal quality, of an uplink transmission corresponding to the grant. Alternatively, or in addition, the monitoring unit may be adapted to determine a received signal quality of channel sounding reference signals of the UE. The received signal quality may in both cases be determined e.g. as a Signal to Noise Ratio, SNR; an energy per bit to noise power spectral density ratio, Eb/N0; a Block Error Rate, BLER; and/or a Bit Error Rate, BER.

The monitoring unit 604 may be adapted to receive instructions from the donor network node regarding which UEs to monitor, as described above. Alternatively, the UORN could be provided with a set of rules for monitoring, e.g. at setup. The arrangement 600 may further comprise a control unit, adapted to receive information from the donor network node, regarding a UE, of which the uplink communication with the donor network node is to be relayed via/by the UORN; and further adapted to relay the uplink communication from the UE to the donor network node according to the information, as described above.

Exemplifying Procedures, Donor Network Node

Exemplifying embodiments of the procedure in a donor network node of supporting connection of a UE to an UORN associated with the donor network node will be described below with reference to FIG. 7. The donor network node may be an eNB in an LTE type system.

Figure 7:
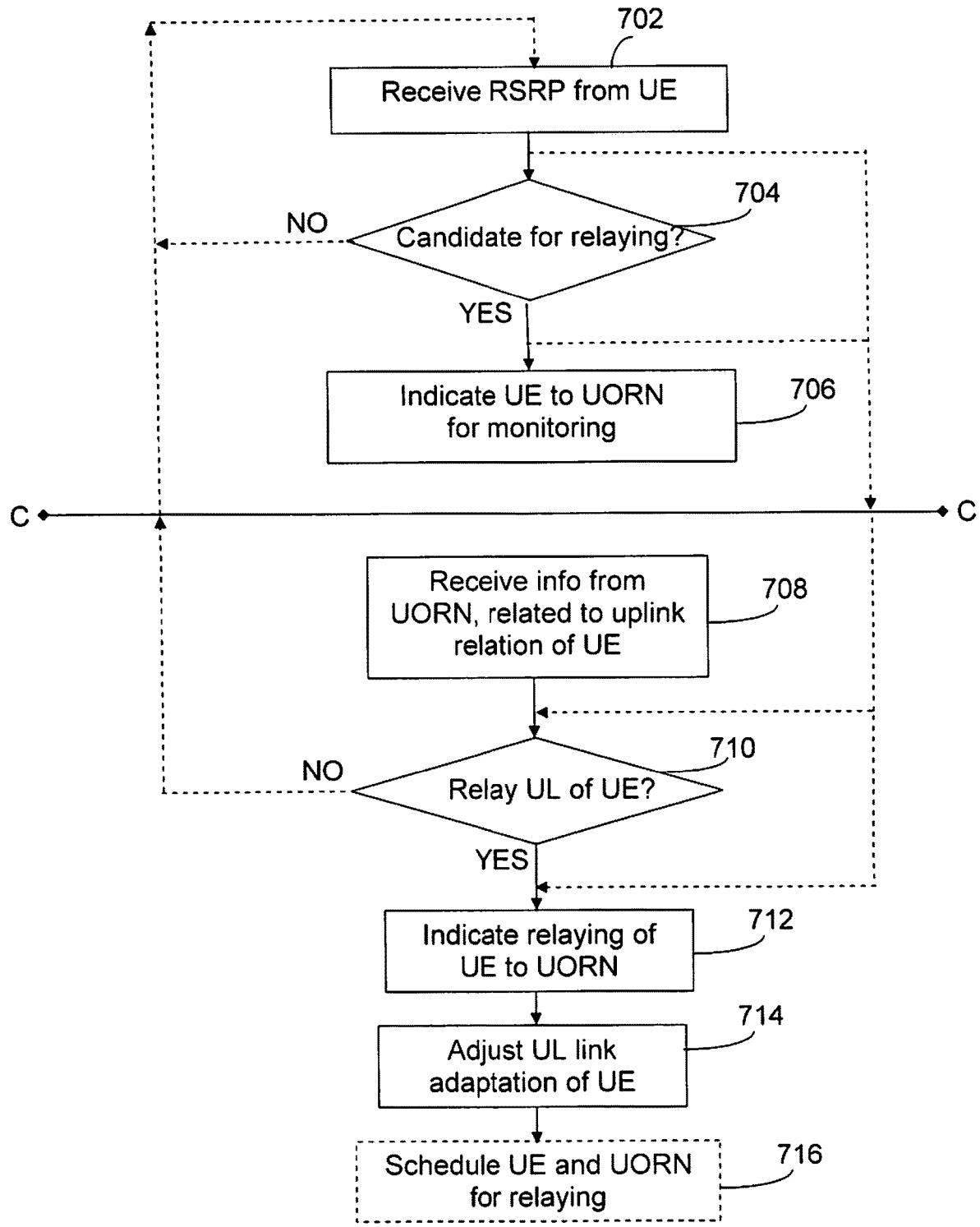
FIG. 7 is a flow chart illustrating the actions in a procedure in a donor network node associated with an Uplink Only Relay Node according to an exemplifying embodiment.

FIG. 7 is divided by a line marked "C". Above the line "C", actions of an exemplifying procedure for determining which UEs that should be monitored by the UORN, are illustrated. Below the line "C", actions of an exemplifying procedure for relaying of a UE which has been indicated as suitable for relaying by the UORN, are illustrated. However, the two procedures may be related, as indicated by the broken lines crossing the line "C". The procedures are further related in that the input to the procedure below line "C" may be a consequence of actions in the procedure above the line.

In the exemplifying procedure below the dividing line "C", information is received from the UORN in an action

708. The information indicates a monitored UE for which a condition is fulfilled, where the condition is related to a relation, in terms of performance, between a direct uplink communication from the UE to the donor network node, and a potential uplink communication relayed via/by the UORN. Then, it may be determined in an action 710 whether the UE should be relayed or not, given the information that the condition is fulfilled. The determining may be based e.g. on rules or conditions which are unknown to the UORN. Alternatively, no such determining is performed, and the indication received from the UORN is enough for that the UE should be relayed. If it is determined in an action 710 that the UE should not, at least not for the moment, be relayed via the UORN, the procedure may e.g. be ended.

If the UE is to be relayed, this is indicated to the UORN in an action 712. The indicating may involve identifying the UE to the UORN, e.g. by sending the UE RNTI to the UORN. Further, if/when the UE is to be relayed, the uplink link adaptation of the UE may be adjusted based on the information received from the UORN in action 708. The adjusted link adaptation could be indicated to the UE e.g. in a grant for uplink communication (which could be intercepted by the UORN, thus enabling the UORN to receive the uplink transmission, which is to be relayed). The indication to the UORN of that the UE should be relayed could involve or comprise an indicator implying that grants for uplink communication related to the UE are to be monitored by the UORN with the purpose of identifying the corresponding uplink transmissions and relaying the same.

In the lower part of FIG. 7 is further illustrated an action 716, of scheduling the UE and UORN for relaying.

In the exemplifying procedure above the dividing line "C", one or more reports are received from a UE, in an action 702, the report(s) indicating an RSRP of reference signals received by the UE. The reference signals concerned by the report may be received by the UE from the donor network node and further from other neighboring network nodes. Based on the one or more received reports, it may be determined in an action 704 whether the UE is a candidate for being relayed in the uplink by the UORN associated with the donor network node. When it is determined in action 704 that the UE is a candidate for being relayed, the identity of said UE is indicated to the UORN, in an action 706, for monitoring. The indication may comprise e.g. an RNTI of the UE to be monitored. The donor network node may provide a list or record comprising e.g. RNTIs of UEs to be monitored to the UORN.

The determining in action 704 may involve comparing of information comprised in the reports to a threshold and/or to a fingerprint. By "fingerprint" is here meant a reference pattern or a template related to signals received by a UE from more than one node, i.e. the (serving) donor network node and/or one or more other neighboring network nodes. Such a fingerprint or reference pattern reflects a position of the UE in relation to the (serving) donor network node and the one or more neighbor network nodes. A threshold, e.g. related to RSRP of signals received from the (serving) donor network node, reflects a position of the UE in relation to said donor network node. The comparison to such a threshold and/or fingerprint enables the donor network node to determine whether the UE may be suitable for relaying. The comparison may even enable determining that the UE is located in a position where it would benefit from being relayed. In such a situation, it may be decided directly, e.g. in action 704, that the UE should be relayed (and not only monitored), by the UORN. This possibility is indicated in FIG. 7 by a broken line from the upper part to the lower part of the figure.

Figure 8:
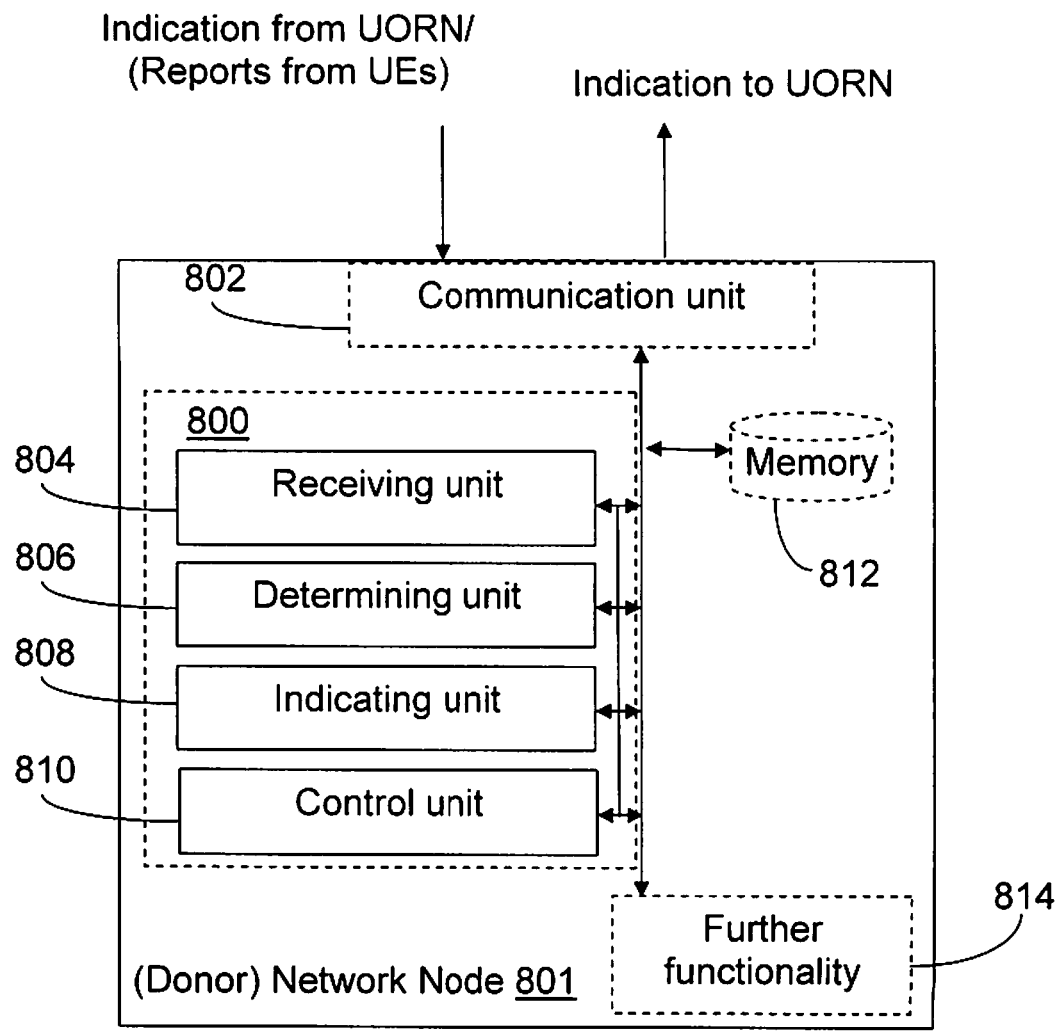
FIG. 8 is a block diagram illustrating a donor network node according to an exemplifying embodiment.

Exemplifying Arrangement, FIG. 8

Below, an exemplifying network node, adapted to enable the performance of the above described procedure in a donor network node of supporting connection of a UE to the UORN will be described with reference to FIG. 8. The network node is operable to serve a cell in a cellular communication system, and further operable to being a donor network node associated with an UORN. The network node may be an eNB in an LTE type system.

The network node is illustrated as to communicate with other entities via a communication unit 802, which may be considered to comprise means for wireless (and possibly wired) communication. The parts of the network node which are adapted to enable the performance of the above described procedure are illustrated as an arrangement 800, surrounded by a dashed line. The arrangement and/or network node may further comprise other functional units 814, for providing e.g. regular network node functions, such as e.g. serving mobile terminals. The arrangement and/or network node may further comprise one or more storage units 812.

The arrangement 800 could be implemented by processing circuitry, e.g. by one or more of: a processor or a micro processor and adequate software (and storage therefore), a Programmable Logic Device (PLD) or other electronic component(s)/processing circuit(s) configured to perform the actions mentioned above in conjunction with FIG. 7.

The arrangement 800 may be implemented and described as follows: The arrangement 800 may comprise a receiving unit 804, adapted to receive information, from the UORN, indicating a monitored UE for which a condition is fulfilled, as previously described. The arrangement 800 may further comprise a determining unit 806, adapted to determine whether the indicated UE should be relayed via the UORN. The arrangement 800 further comprises an indication unit 808, which is adapted to indicate to the UORN that the UE will be relayed via the UORN (when that is the case). The arrangement 800 further comprises a control unit 810, adapted to adjust uplink link adaptation of the UE based on the received information.

The determining unit 806 may further be adapted to determine whether a UE is a candidate for being relayed in the uplink by the UORN, based on reports received from the UE, as previously described. The indicating unit 808 may further be adapted to indicate the UE to the UORN for monitoring when it is determined that the UE is a candidate for being relayed e.g. according to a previously described procedure. The control unit may further be adapted to control e.g. the correlated scheduling of the UE and the UORN during the relaying.

Figure 9:
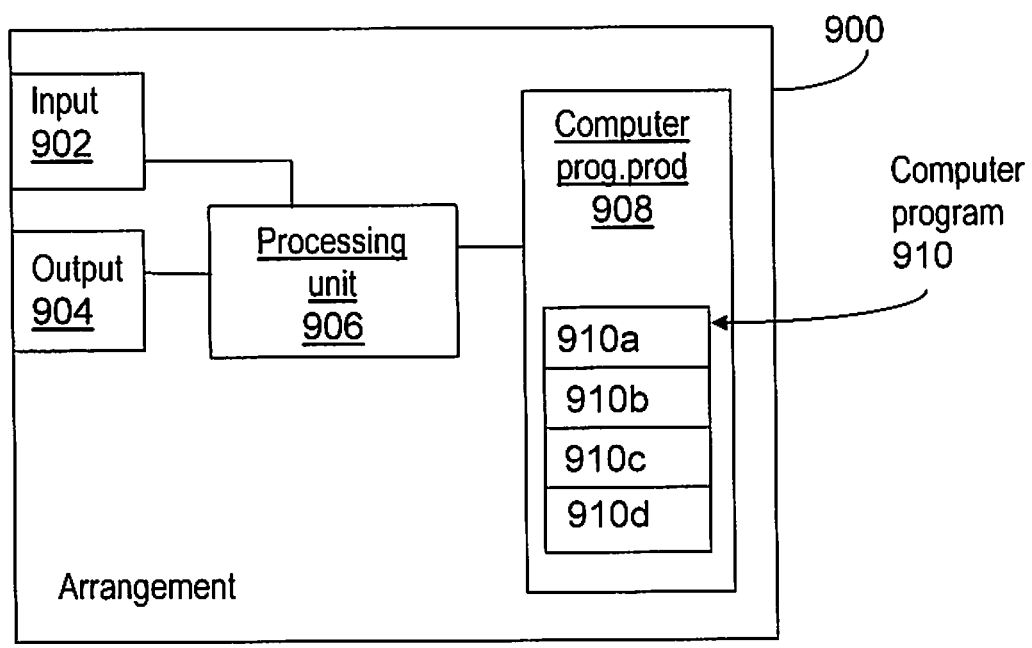
FIG. 9 is a block diagram illustrating an exemplifying embodiment of an Uplink Only Relay Node or a donor network node.

Exemplifying Arrangement, FIG. 9

Figure 6:
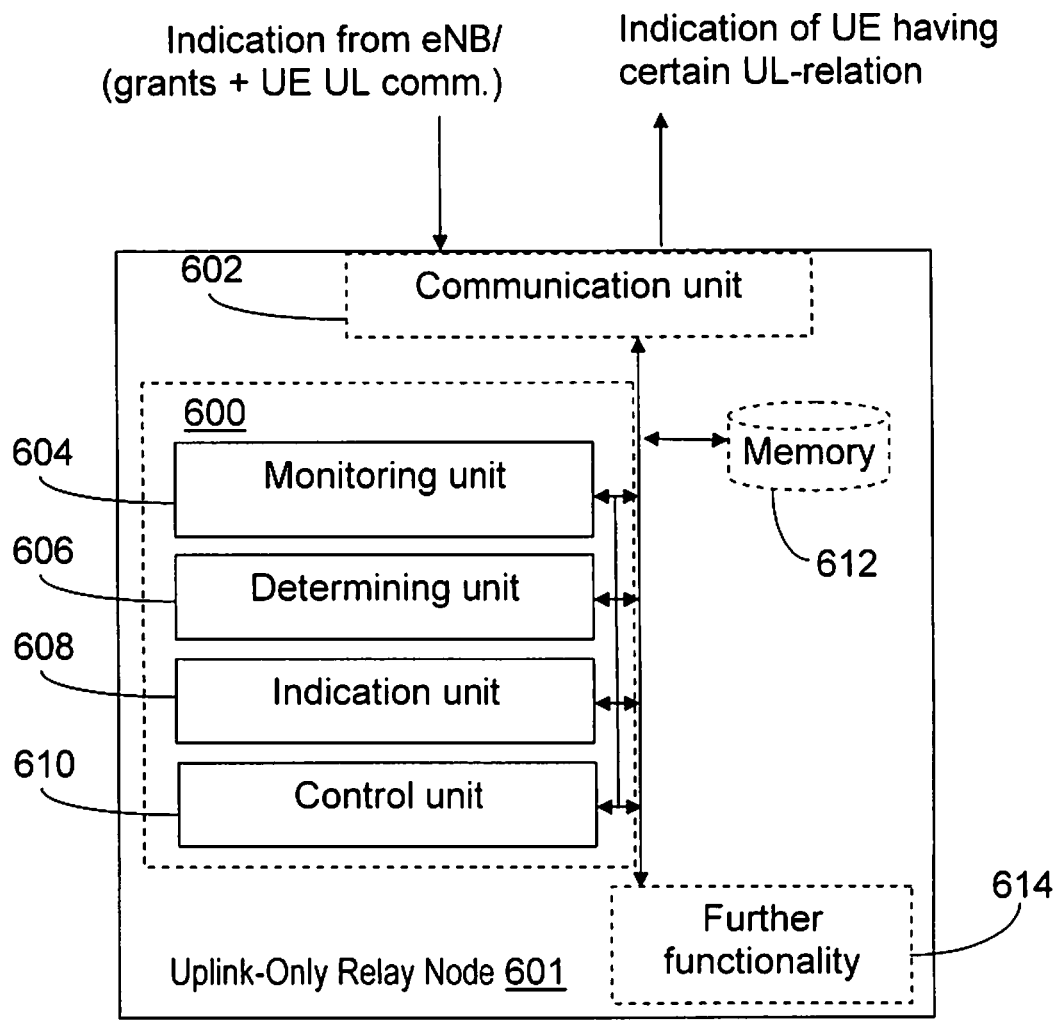
FIG. 6 is a block diagram illustrating an Uplink Only Relay Node according to an exemplifying embodiment.

FIG. 9 schematically shows an embodiment of an arrangement 900 in a network node, which also can be an alternative way of disclosing an embodiment of the arrangement in a network node illustrated in FIG. 6. Comprised in the arrangement 900 are here a processing unit 906, e.g. with a DSP (Digital Signal Processor). The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit 902 and the output unit 904 may be arranged as an integrated entity.

Furthermore, the arrangement 900 comprises at least one computer program product 908 in the form of a non-volatile memory, e.g. an EEPROM (Electrically Erasable Programmable Read-Only Memory), a flash memory and a hard drive. The computer program product 908 comprises a computer program 910, which comprises code means, which when executed in the processing unit 906 in the arrangement 900 causes the arrangement and/or the network node to perform the actions e.g. of the procedure described earlier in conjunction with FIGS. 5a and 5b.

The computer program 910 may be configured as a computer program code structured in computer program modules. Hence, in an exemplifying embodiment, the code means in the computer program 910 of the arrangement 900 may comprise a monitoring module 910a for monitoring a relation, in terms of performance, between a direct uplink communication and a potential relayed uplink communication. The computer program may further comprise a determining module 910b for determining whether the monitored relation fulfills a condition. The computer program 910 further may further comprise an indication module 910c for indicating, to another network node, when the relation fulfills a condition. The computer program 910 may further comprise a control module 910d, for controlling e.g. relaying of the uplink communication according to information received from a/the other network node. The computer program may further comprise additional modules, e.g. for providing other desired functionality.

Figure 5A:
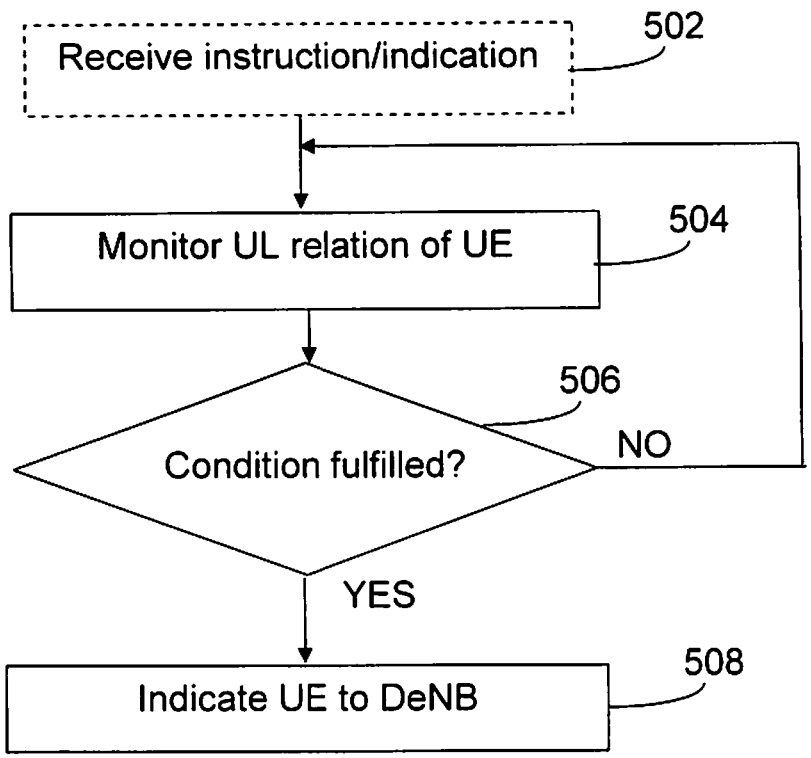
FIGS. 5a-b are flow charts illustrating the actions in procedures in an Uplink Only Relay Node according to exemplifying embodiments.
Figure 5B:
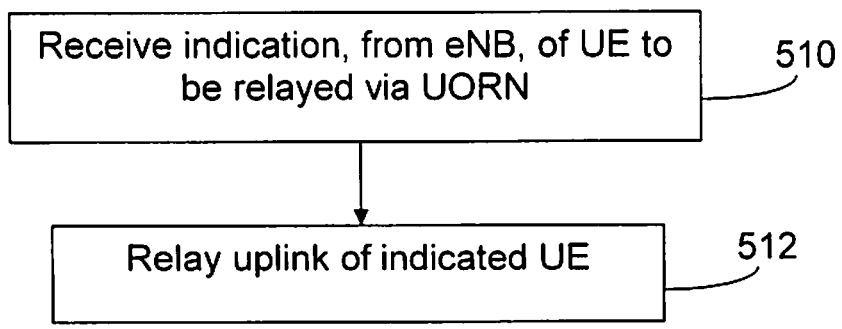

The modules 910a-d could essentially perform the actions of the flows illustrated in FIGS. 5a and 5b, to emulate the arrangement in a network node illustrated in FIG. 6. In other words, when the different modules 910a-d are executed in the processing unit 906, they may correspond to the units 604-610 of FIG. 6.

Although the code means in the embodiment disclosed above in conjunction with FIG. 9 are implemented as computer program modules which when executed in the processing unit causes the arrangement and/or network node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

In a similar manner, an exemplifying embodiment comprising computer program modules could be described for the arrangement in a network node illustrated in FIG. 8.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

The invention claimed is:

1. A method in an Uplink-Only Relay Node (UORN) associated with a donor network node, the donor network node serving a cell in a cellular communication system, the method being suitable for supporting connection of a user equipment (UE) in the cell to the UORN for uplink communication, the method comprising:
  monitoring a relation between a performance of a direct uplink communication from the UE to the donor network node and an expected performance for a potential relayed uplink communication from the UE to the donor network node via the UORN, wherein monitoring the relation comprises reading a grant for uplink communication, which is sent from the donor network node to the UE, and acquiring, from one or more parameters included in the grant, information regarding a quality of a link between the UE and the donor network node; and
  indicating to the donor network node when the relation fulfills a condition, wherein the condition relates to that a potential relayed uplink, and a backhaul link from the UORN to the donor network node, support a larger transport block size as compared to a transport block size used on the direct uplink communication.

2. The method of claim 1, wherein monitoring the relation further comprises determining a received signal quality, of an uplink transmission corresponding to the grant.

3. The method of claim 2, wherein the received signal quality is determined as one or more of:
  Signal to Noise Ratio (SNR);
  Eb/N0;
  Block Error Rate (BLER); and
  Bit Error Rate (BER).

4. The method of claim 1, wherein monitoring the relation further comprises determining a received signal quality of channel sounding reference signals of the UE.

5. The method of claim 1, wherein the condition relates to that the potential relayed uplink supports a transport block size being twice the size of the transport block size of the direct uplink communication.

6. The method of claim 1, wherein the UE of which the relation is to be monitored is selected based on a UE indicator received from the donor network node.

7. The method of claim 1, wherein the UE of which the relation is to be monitored is selected based on one of a Physical Downlink Control Channel (PDCCH) format 2 and a PDCCH format 3, of grants for uplink transmission, sent from the donor network node to the UE.

8. The method of claim 1, further comprising:
  receiving information from the donor network node, regarding a UE, of which the uplink communication with the donor network node is to be relayed via the UORN; and
  relaying uplink communication from the UE to the donor network node, according to the information.

9. An Uplink-Only Relay Node (UORN) operable to be associated with a donor network node, the donor network node serving a cell in a cellular communication system, the UORN being suitable for supporting connection of a user equipment (UE) in the cell to the UORN for uplink communication, the UORN comprising:
communication circuitry; and
processing circuitry operatively connected to the communication circuitry and configured to:
monitor a relation between a performance of a direct uplink communication from the UE to the donor network node and an expected performance for a potential relayed uplink communication from the UE to the donor network node via the UORN; and
indicate to the donor network node when the relation fulfills a condition;
wherein the processing circuitry is further configured to, as part of the monitoring, read a grant for uplink communication, which is sent from the donor network node to the UE, and to acquire, from one or more parameters included in the grant, information regarding the quality of a link between the UE and the donor network node, and wherein the condition relates to that a potential relayed uplink, and a backhaul link from the UORN to the donor network node, support a larger transport block size as compared to a transport block size used on the direct uplink communication.

10. The UORN of claim 9, wherein the processing circuitry is further configured to, as part of the monitoring, determine a received signal quality of an uplink transmission corresponding to the grant.

11. The UORN of claim 10, wherein the processing circuitry is further configured to determine the received signal quality as one or more of:
Signal to Noise Ratio (SNR);
Eb/N0;
Block Error Rate (BLER); and
Bit Error Rate (BER).

12. The UORN of claim 9, wherein the processing circuitry is further configured to, as part of the monitoring, determine a received signal quality of channel sounding reference signals of the UE.

13. The UORN of claim 9, wherein the condition relates to that the potential relayed uplink would support a transport block size being twice the size of the transport block size of the direct uplink.

14. The UORN of claim 9, wherein the processing circuitry is further configured to select a UE of which the relation is to be monitored based on a UE indicator received from the donor network node.

15. The UORN of claim 9, wherein the processing circuitry is further configured to select a UE of which the relation is to be monitored based on one of a Physical Downlink Control Channel (PDCCH) format 2 and a PDCCH format 3, of grants for uplink transmission, sent from the donor network node to the UE.

16. The UORN of claim 9, wherein the processing circuitry is further configured to:
receive information from the donor network node, regarding a UE, of which the uplink communication with the donor network node is to be relayed via the UORN; and
relay uplink communication from the UE to the donor network node, according to the information.

17. A method in a donor network node serving a cell in a cellular communication system, the donor network node being associated with an Uplink-Only Relay Node (UORN), the method being suitable for supporting connection of a user equipment (UE) in the cell to the UORN for uplink communication with the donor network node, the method comprising:

receiving information, from the UORN, indicating a monitored UE for which a condition is fulfilled, the condition being related to a relation between a performance of a direct uplink communication from the UE to the donor network node and an expected performance for a potential relayed uplink communication relayed via the UORN, wherein the condition relates to that a potential relayed uplink, and a backhaul link from the UORN to the donor network node, support a larger transport block size as compared to a transport block size used on the direct uplink communication; and
in response to determining that the UE is to be relayed:
indicating, to the UORN, that the UE will be relayed via the UORN; and
adjusting uplink link adaptation of the UE based on the information.

18. The method of claim 17, wherein the method further comprises:
receiving reports, from a UE in the cell, related to a received power of reference signals received by the UE;
determining, based on the reports, whether the UE is a candidate for being relayed in the uplink by the UORN; and
when it is determined that the UE is a candidate for being relayed, indicating the UE to the UORN for monitoring.

19. The method of claim 18, wherein the reports relate to one of:
received power of reference signals from the donor network node; and
received power of reference signals from the donor network node and neighboring network nodes.

20. The method of claim 18, wherein the determining comprises comparing information comprised in the reports to at least one of a threshold and a reference pattern related to signals received from at least two different network nodes.

21. The method of claim 20, wherein the reference pattern reflects a position of the UE in relation to the donor network node and at least one other network node, and the threshold reflects a position of the UE in relation to the donor network node.

22. The method of any of claim 18, further comprising determining, based on the reports, that the UE is to be relayed in the uplink by the UORN.

23. The method of claim 17, wherein the indicating step, to the UORN, that the UE will be relayed via the UORN, comprises sending an indicator to the UORN implying that grants for uplink communication related to the UE are to be monitored by the UORN.

24. A network node, operable to serve cell in a cellular communication system, and further operable to being a donor network node, associated with an Uplink-Only Relay Node (UORN) the network node being suitable for supporting connection of a user equipment (UE) in the cell to the UORN for uplink communication with the network node, the network node comprising:
communication circuitry; and
processing circuitry operatively connected to the communication circuitry and configured to:
receive information, from the UORN, indicating a monitored UE for which a condition is fulfilled, the condition being related to a relation between a performance of a direct uplink communication from the UE to the donor network node and an expected performance for a potential relayed uplink communication relayed via the UORN, wherein the condition relates to that a potential relayed uplink, and a backhaul link from the UORN to the donor network node, support a larger transport block size as compared to a transport block size used on the direct uplink communication; and in response to determining that the UE is to be relayed:
  indicate, to the UORN, that the UE will be relayed via the UORN; and
  adjust uplink link adaptation of the UE based on the information.

25. The network node of claim 24, wherein the processing circuitry is further configured to:
  receive reports, from a UE in the cell, related to a received power of reference signals received by the UE;
  determine, based on the reports, whether the UE is a candidate for being relayed in the uplink by the UORN; and
  when it is determined that the UE is a candidate for being relayed indicate the UE to the UORN for monitoring.

26. The network node of claim 25, wherein the reports relate to one of:
  received power of reference signals from the network node; and
  received power of reference signals from the network node and neighboring network nodes.

27. The network node of claim 25, wherein the processing circuitry is further configured to determine, based on the reports, that the UE is to be relayed in the uplink by the UORN.

28. The network node of claim 24, wherein the determining comprises comparing information comprised in the reports to at least one of:
  a threshold, and a reference pattern related to signals received from at least two different network nodes.

29. The network node of claim 28, wherein the reference pattern reflects a position of the UE in relation to the network node and at least one other network node, and the threshold reflects a position of the UE in relation to the network node.

30. The network node of claim 24, wherein the indicating, to the UORN, that the UE will be relayed via the UORN, comprises an indicator implying that grants for uplink communication related to the UE are to be monitored by the UORN.

* * * * *